(12) United States Patent
Wang et al.

(10) Patent No.: US 11,179,733 B1
(45) Date of Patent: Nov. 23, 2021

(54) WATER PATH SWITCHING DEVICE AND SHOWER EQUIPMENT

(71) Applicant: XIAMEN KEEKOE SANITARY WARE CO., LTD, Xiamen (CN)

(72) Inventors: Chao Wang, Xiamen (CN); Jingbiao Zhang, Xiamen (CN)

(73) Assignee: XIAMEN KEEKOE SANITARY WARE CO., LTD, Xiamen (CN)

(*) Notice: Subject to any disclaimer, the term of this patent is extended or adjusted under 35 U.S.C. 154(b) by 0 days.

(21) Appl. No.: 17/033,886

(22) Filed: Sep. 27, 2020

(30) Foreign Application Priority Data

Aug. 4, 2020 (CN) .......................... 202010772049.4

(51) Int. Cl.
*B05B 1/16* (2006.01)
*F16K 11/078* (2006.01)
*F16K 31/60* (2006.01)

(52) U.S. Cl.
CPC .......... *B05B 1/1645* (2013.01); *F16K 11/078* (2013.01); *F16K 31/605* (2013.01); *Y10T 137/86549* (2015.04)

(58) Field of Classification Search
CPC ... B05B 1/1645; F16K 11/078; F16K 31/605; Y10T 137/86549
See application file for complete search history.

(56) References Cited

U.S. PATENT DOCUMENTS

| | | | | |
|---|---|---|---|---|
| 6,076,747 | A * | 6/2000 | Ming-Yuan | B05B 1/1645 239/383 |
| 8,602,059 | B2 * | 12/2013 | Miller | E03C 1/0412 137/625.5 |
| 2016/0340874 | A1 * | 11/2016 | Liang | F16K 11/0445 |
| 2019/0301621 | A1 * | 10/2019 | Guindi | F16K 11/085 |

* cited by examiner

*Primary Examiner* — Kevin R Barss
(74) *Attorney, Agent, or Firm* — JCIP Global Inc.

(57) ABSTRACT

A water path switching device includes a valve body, a rotating shaft, a rotating plate, a first valve core and a second valve core. The valve body is provided with a valve cavity, a water inlet, and at least two water outlets. The rotating shaft is rotationally connected to the valve body, and is provided with an outer end located outside the valve cavity and an inner end located inside the valve cavity. The rotating plate is arranged in the valve cavity and connected to the inner end of the rotating shaft so as to rotate with the rotating shaft. The first valve core is provided with a first sliding-contact part.

12 Claims, 11 Drawing Sheets

WATER PATH SWITCHING DEVICE AND SHOWER EQUIPMENT

CROSS-REFERENCE TO RELATED APPLICATION

This application claims the priority benefit of China application serial no. 202010772049.4, filed on Aug. 4, 2020. The entirety of the above-mentioned patent application is hereby incorporated by reference herein and made a part of this specification.

BACKGROUND

Technical Field

The present application relates to a water path switching device and shower equipment provided with the water path switching device.

Description of Related Art

Shower systems in bathrooms are generally provided with various water outlet devices, such as handheld shower heads, overhead shower heads and spray guns. In order to enable water flow to be freely switched between the various water outlet devices, a water path switching device is usually arranged for water path switching control. A control valve core of an existing water path switching device usually adopts a water diversion structure with water diversion holes, and adopts a sealing gasket or a sealing ring to seal and isolate the water diversion holes in the water distribution structure, while the water path switching device needs to overcome friction force generated by the sealing gasket or the sealing ring during the switching process, then the driving force value for driving the water path switching device is large, which in turn leads to laborious switching and poor operation experience.

SUMMARY

In order to solve the above-mentioned problems, the present application provides a water path switching device and shower equipment provided with the water path switching device, the water path switching device can be switched and controlled more easily, the operation experience is better, and the structure is simple.

In order to achieve the above objective, according to one aspect of the present application, the present application provides the following technical solutions.

A water path switching device includes a valve body, a rotating shaft, a rotating plate, a first valve core and a second valve core. The valve body provided with a valve cavity, a water inlet communicating with the valve cavity, and at least two water outlets, and the water outlets include a first water outlet and a second water outlet. The rotating shaft is rotationally connected to the valve body and is provided with an outer end located outside the valve cavity and an inner end located inside the valve cavity. The rotating plate is arranged in the valve cavity and is connected to the inner end of the rotating shaft so as to rotate with the rotating shaft. The rotating plate is provided with a sliding groove, and the sliding groove is provided with high points far away from the axis line of the rotating shaft, and a low point close to the axis line of the rotating shaft. The first valve core is provided with a first sliding-contact part sliding in the sliding groove. When the rotating plate rotates to drive the first sliding-contact part to slide to the high points, the first valve core is away from the axis line of the rotating shaft so as to close or open the first water outlet. When the rotating plate rotates to drive the first sliding-contact part to slide to the low point, the first valve core is close to the axis line of the rotating shaft so as to open or close the first water outlet. The second valve core is provided with a second sliding-contact part sliding in the sliding groove. When the rotating plate rotates to drive the second sliding-contact part to slide to the high points, the second valve core is away from the axis line of the rotating shaft so as to close or open the second water outlet. When the rotating plate rotates to drive the second sliding-contact part to slide to the low point, the second valve core is close to the axis line of the rotating shaft so as to open or close the second water outlet.

According to the water path switching device of the present application, by arranging the rotating shaft, the rotating plate, the first valve core and the second valve core, when the rotating shaft drives the rotating plate to rotate, the rotating plate then controls the first valve core to control opening and closing of the first water outlet and controls the second valve core to control opening and closing of the second water outlet, the structure is simple, and there is no need to overcome the friction force generated by sealing gaskets of water diversion structures adopted currently during the movement process, the rotation force value of the rotating shaft is greatly reduced, and the operation experience is better.

In an optional or preferred embodiment, the axis line of the first water outlet is perpendicular to the axis line of the second water outlet, both the first valve core and the second valve core slide in the radial direction of the rotating shaft, and the sliding direction of the first valve core is perpendicular to that of the second valve core.

In the above solution, the sliding direction of the first valve core is perpendicular to that of the second valve core, so that the structure of the water path switching device is more compact.

In an optional or preferred embodiment, the sliding groove is provided with a first arc section, and the two ends of the first arc section form the high points, namely the first high point and the second high point. A middle portion of the first arc section forms the low point, when the first sliding-contact part slides to the first high point, the second sliding-contact part slides to the low point, and when the first sliding-contact part slides to the low point, the second sliding-contact part slides to the second high point.

In the above solution, by forming the two high points and forming the low point between the two high points, the first sliding-contact part and the second sliding-contact part can be alternately switched between the high points and the low point, then water in the water inlet can alternately flow out from the first water outlet and the second water outlet, and the structure design is quite ingenious.

In an optional or preferred embodiment, a first intermediate point is formed between the first high point and the low point, a second intermediate point is formed between the second high point and the low point, and the distance from the first intermediate point to the axis line of the rotating shaft is between the distance from the first high point to the axis line of the rotating shaft and the distance from the low point to the axis line of the rotating shaft. When the first sliding-contact part slides to the first intermediate point, the second sliding-contact part slides to the second intermediate point, at this time, the first valve core opens the first water outlet and the second valve core opens the second water outlet, or the first valve core closes the first water outlet and the second valve core closes the second water outlet.

In the above solution, by forming the first intermediate point and the second intermediate point, a water outlet state is added to the water path switching device, namely a state where the two water outlets simultaneously output water or simultaneously stop water, and the structure design is ingenious and reliable.

In an optional or preferred embodiment, the sliding groove further includes a second arc section connected to the second high point, the end, away from the second high point, of the second arc section forms a third high point, and when the first sliding-contact part slides to the second high point, the second sliding-contact part slides to the third high point.

In the above solution, by forming the third high point, a water outlet state is added to the water path switching device, namely a state where the two water outlets simultaneously output water or simultaneously stop water, and the structure design is ingenious and reliable.

In an optional or preferred embodiment, the distances from the first high point, the second high point and the third high point to the axis line of the rotating shaft are equal.

In an optional or preferred embodiment, the sliding groove penetrates through a front surface and a back surface of the rotating plate, the first sliding-contact part is a first sliding column, the second sliding-contact part is a second sliding column, the first sliding column and the second sliding column are arranged in the sliding groove in a penetrating mode, the first valve core further includes a first valve plate and a first sliding rod connected to the first valve plate and the first sliding column, and the second valve core further includes a second valve plate and a second sliding rod connected to the second valve plate and the second sliding column.

In an optional or preferred embodiment, the valve body is provided with a first water outlet connector and a second water outlet connector, a first valve seat with two open ends is arranged in the first water outlet connector in a sleeved manner, the first valve seat is provided with the first water outlet, the first valve core is slidably arranged in the first valve seat and in opening and closing fit with the first water outlet, a second valve seat with two open ends is arranged in the second water outlet connector in a sleeved manner, the second valve seat is provided with the second water outlet, and the second valve core is slidably arranged in the second valve seat and in opening and closing fit with the second water outlet.

In the above solution, by arranging the first valve seat and the second valve seat, arranging the first valve core on the first valve seat, and arranging the second valve core on the second valve seat, the process of installing the first valve core and the second valve core on the valve body is simpler and more convenient.

In an optional or preferred embodiment, a first sealing member is arranged between the first valve core and the first water outlet, a first elastic member is further arranged between the first valve core and the first valve seat, and the first elastic member applies elastic force to the first valve core in the direction where the first water outlet is closed. A second sealing member is arranged between the second valve core and the second water outlet, a second elastic part is further arranged between the second valve core and the second valve seat, and the second elastic part applies elastic force to the second valve core in the direction where the second water outlet is closed.

In the above solution, by arranging the first elastic member and the second elastic part, the first valve core and the second valve core can seal the corresponding water outlets more reliably.

In an optional or preferred embodiment, the water path switching device further includes a knob rotationally connected to the valve body, the knob is connected to the outer end of the rotating shaft so as to drive the rotating shaft to rotate, a grade positioning structure is arranged between the knob/rotating shaft and the valve body, the grade positioning structure includes a spring pin arranged on one of the knob/rotating shaft and the valve body, and a plurality of positioning holes formed in the other of the knob/rotating shaft and the valve body, and when the knob rotates relative to the valve body, the spring pin and the positioning holes are sequentially and cooperatively locked.

In the above solution, by arranging the grade positioning structure, grade control is more precise, and the adjustment process is more visual.

According to another aspect of the present application, the present application further provides shower equipment which includes shower heads and the water path switching device of any one of the above description, and the first water outlet and/or the second water outlet are/is connected to the shower heads.

In an optional or preferred embodiment, an insertion base is further installed on the outer side of the valve body of the water path switching device.

BRIEF DESCRIPTION OF THE DRAWINGS

In order to make the advantages of the present application easier to understand, the present application briefly described above is described in more detail with reference to specific embodiments shown in the accompanying drawings. It should be understood that these accompanying drawings only depict typical embodiments of the present application, and therefore should not be considered as limiting the scope of protection thereof. The present application is described and explained with additional features and details through the accompanying drawings. In the accompanying drawings.

DESCRIPTION OF THE EMBODIMENTS

In order to make the technical problems to be solved by the present application, technical solutions and beneficial effects clearer, the present application is described in detail with reference to the accompanying drawings and embodiments below. It should be understood that the specific embodiments described herein are only used to explain the present application, but not to limit the present application.

In the following discussion, details are given in order to provide a more thorough understanding of the present application. However, those skilled in the art can understand that the present application can be implemented without one or more of these details. In certain examples, in order to avoid confusion with the present application, some technical features known in the art are not described in detail. It should be noted that the terms "upper", "lower", "front", "rear", "left", "right" and similar expressions used herein are for illustrative purposes only instead of limiting.

The ordinal words such as "first" and "second" cited in the present application are merely identifications, and do not have any other meanings such as a specific order. Also, for example, the term "first component" does not imply the existence of "second component", and the term "second component" does not imply the existence of "first component".

Referring to FIGS. 1 to 11, a water path switching device according to a preferred embodiment of the present application is used for switching water paths so as to control the flow direction of water flow, and includes a valve body 10, a rotating shaft 20, a rotating plate 30, a first valve core 40 and a second valve core 50.

The valve body 10 is provided with a valve cavity 11, a water inlet 12 communicating with the valve cavity 11, and at least two water outlets. The water outlets include a first water outlet 13 and a second water outlet 14, and water entering the valve cavity 11 from the water inlet 12 flows out through the first water outlet 13 or the second water outlet 14. In the embodiment, the valve body 10 includes a hollow inner valve body 10a, a hollow outer valve body 10b and glands 10c connected to a top opening of the inner valve body 10a in a covering mode. The inner valve body 10a is detachably sleeved with the outer valve body 10b in a sealed mode, the outer valve body 10b is provided with a water inlet connector 15 communicating with the water inlet 12, a first water outlet connector 16 communicating with the first water outlet 13, and a second water outlet connector 17 communicating with the second water outlet 14.

The rotating shaft 20 is rotationally connected to the valve body 10 and provided with an outer end located outside the valve cavity 11, and an inner end located inside the valve cavity 11; and the glands 10c of the valve body 10 are provided with rotating shaft receding holes 18, and the rotating shaft 20 is arranged in the rotating shaft receding holes 18 in a penetrating mode.

The rotating plate 30 is arranged in the valve cavity 11 and connected to the inner end of the rotating shaft 20 so as to rotate with the rotating shaft 20. The rotating plate 30 is provided with a sliding groove 31. The sliding groove 31 is provided with high points 32 far away from the axis line of the rotating shaft 20, and a low point 33 close to the axis line of the rotating shaft 20.

The first valve core 40 is provided with a first sliding-contact part 41 sliding in the sliding groove 31, and when the rotating plate 30 rotates to drive the first sliding-contact part 41 to slide to the high points 32, the first valve core 40 is far away from the axis line of the rotating shaft 20 so as to close or open the first water outlet 13. When the rotating plate 30 rotates to drive the first sliding-contact part 41 to slide to the low point 33, the first valve core 40 is close to the axis line of the rotating shaft 20 so as to open or close the first water outlet 13.

The second valve core 50 is provided with a second sliding-contact part 51 sliding in the sliding groove 31, and when the rotating plate 30 rotates to drive the second sliding-contact part 51 to slide to the high points 32, the second valve core 50 is away from the axis line of the rotating shaft 20 so as to close or open the second water outlet 14. When the rotating plate 30 rotates to drive the second sliding-contact part 51 to slide to the low point 33, the second valve core 50 is close to the axis line of the rotating shaft 20 so as to open or close the second water outlet 14.

According to the water path switching device of the present application, by arranging the rotating shaft 20, the rotating plate 30, the first valve core 40 and the second valve core 50, when the rotating shaft 20 drives the rotating plate 30 to rotate, the rotating plate 30 then controls the first valve core 40 to control opening and closing of the first water outlet 13 and controls the second valve core 50 to control opening and closing of the second water outlet 14, the structure is simple, and there is no need to overcome the friction force generated by sealing gaskets of water diversion structures adopted currently during the movement process, the rotation force value of the rotating shaft 20 is greatly reduced, and the operation experience is better.

As shown in FIG. 3 and FIGS. 8 to 11, in the water path switching device of the embodiment, the axis line of the first water outlet 13 is perpendicular to the axis line of the second water outlet 14, both the first valve core 40 and the second valve core 50 slide in the radial direction of the rotating shaft 20, and the sliding direction of the first valve core 40 is perpendicular to that of the second valve core 50. By setting the sliding directions of the first valve core 40 and the second valve core 50 to be perpendicular, the structure of the water path switching device is more compact.

As shown in FIG. 6 and FIGS. 8 to 11, in the water path switching device of the embodiment, the sliding groove 31 is provided with a first arc section 311, the two ends of the first arc section 311 form the high points 32, namely the first high point 321 and the second high point 322, a middle portion of the first arc section 311 forms the low point 33, when the first sliding-contact part 41 slides to the first high point 321, the second sliding-contact part 51 slides to the low point 33, and when the first sliding-contact part 41 slides to the low point 33, the second sliding-contact part 51 slides to the second high point 322. By forming the two high points 32 and the low point 33 between the two high points 32, the first sliding-contact part 41 and the second sliding-contact part 51 can be alternately switched between the high points 32 and the low point 33, therefore, water in the water inlet 12 can alternately flow out from the first water outlet 13 and the second water outlet 14, and the structure design is quite ingenious.

Continuing to refer to FIG. 6 and FIGS. 8 to 11, in the embodiment, a first intermediate point 341 is formed between the first high point 321 and the low point 33, a second intermediate point 342 is formed between the second high point 322 and the low point 33, and the distance from the first intermediate point 341 to the axis line of the rotating shaft 20 is between the distance from the first high point 321 to the axis line of the rotating shaft 20 and the distance from the low point 33 to the axis line of the rotating shaft 20. When the first sliding-contact part 41 slides to the first intermediate point 341, the second sliding-contact part 51 slides to the second intermediate point 342, at this time, the first valve core 40 opens the first water outlet 13 and the second valve core 50 opens the second water outlet 14, or the first valve core 40 closes the first water outlet 13 and the second valve core 50 closes the second water outlet 14. By forming the first intermediate point 341 and the second intermediate point 342, a water outlet state is added to the water path switching device, namely a state where the two water outlets simultaneously output water or simultaneously stop water, and the structure design is ingenious and reliable.

Continuing to refer to FIG. 6 and FIGS. 8 to 11, in the water path switching device of the embodiment, the sliding groove 31 further includes a second arc section 312 connected to the second high point 322, the end, away from the second high point 322, of the second arc section 312 forms a third high point 323, and when the first sliding-contact part 41 slides to the second high point 322, the second sliding-contact part 51 slides to the third high point 323. By forming the third high point 323, a water outlet state is added to the water path switching device, namely a state where the two water outlets simultaneously output water or simultaneously stop water, and the structure design is ingenious and reliable.

Figure 1:
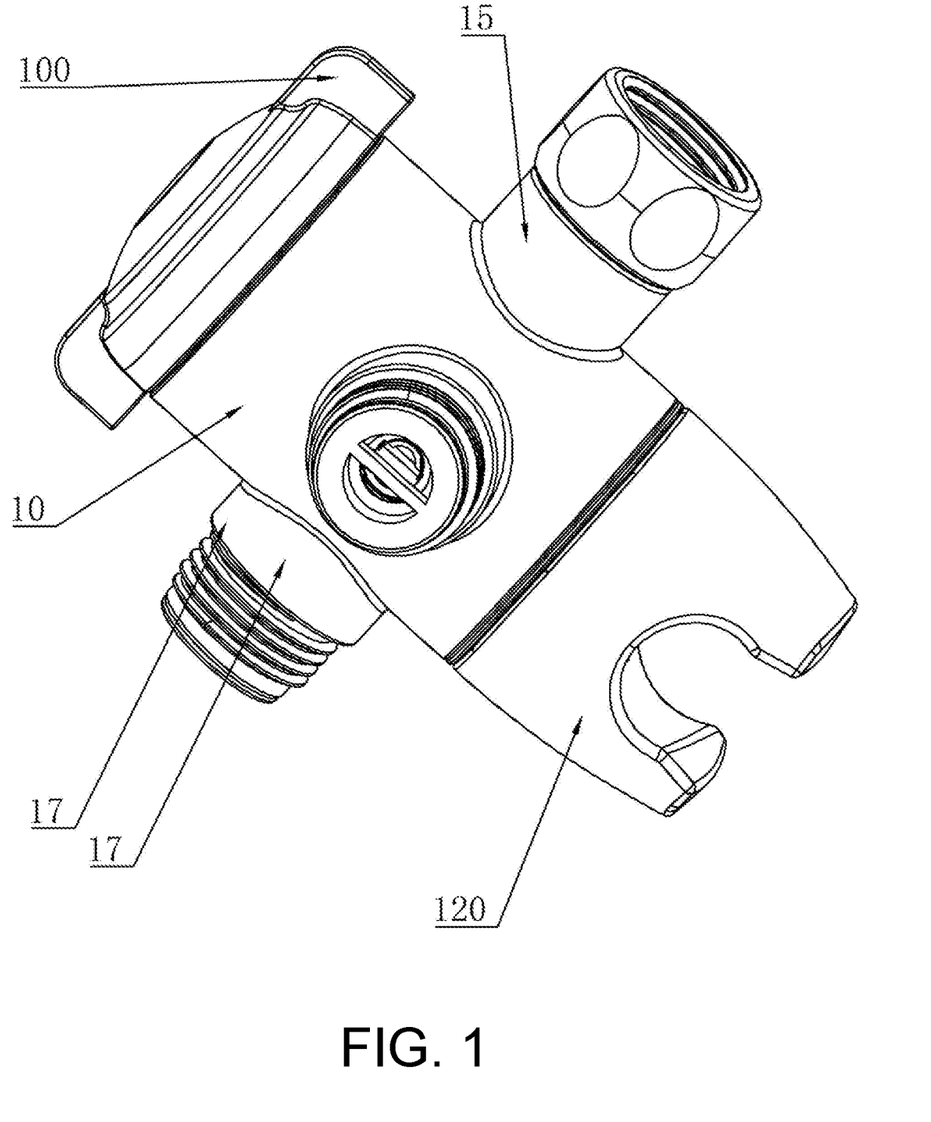
FIG. 1 is an assembled three-dimensional structure diagram of a water path switching device according to an embodiment of the present application.
Figure 2:
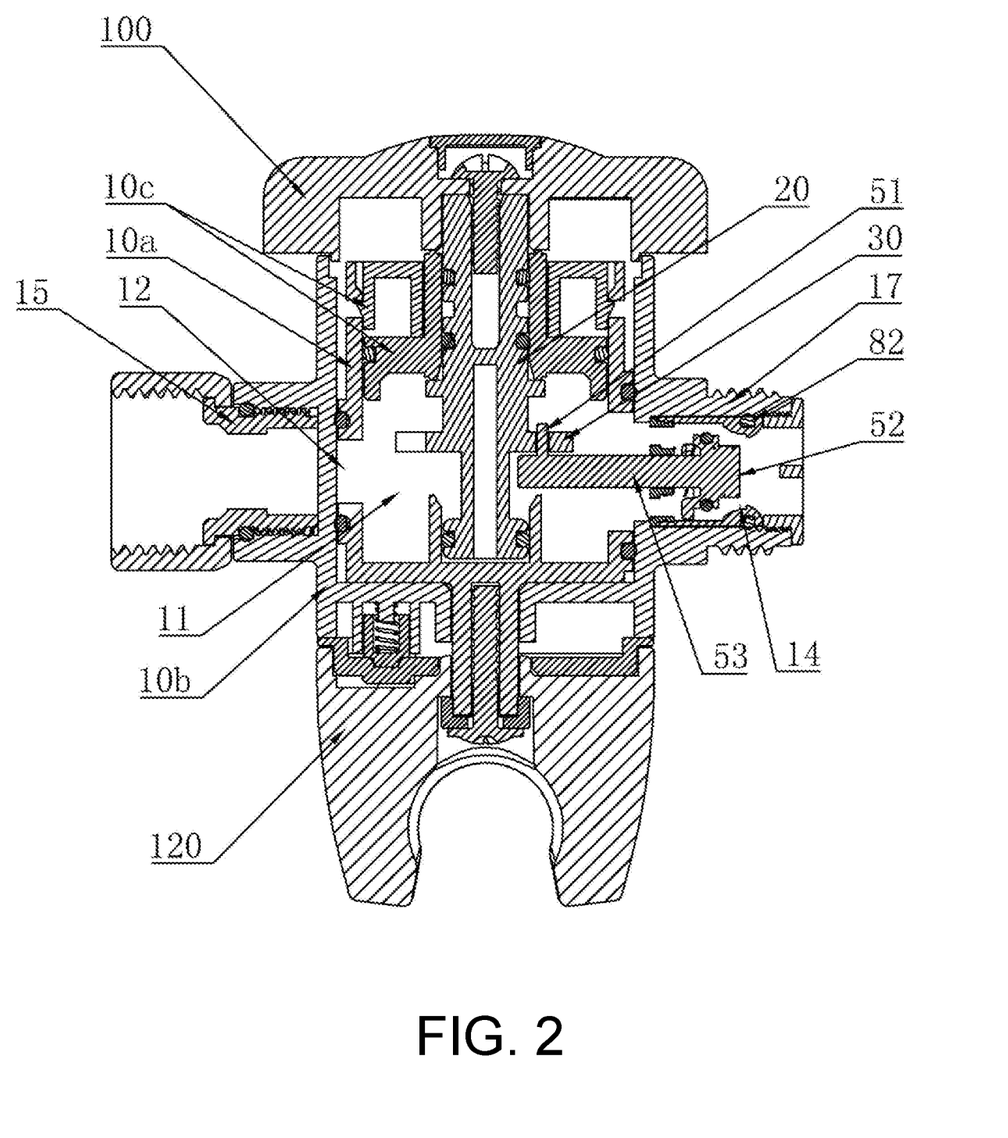
FIG. 2 is a cross-sectional view of a water path switching device according to an embodiment of the present application.
Figure 3:
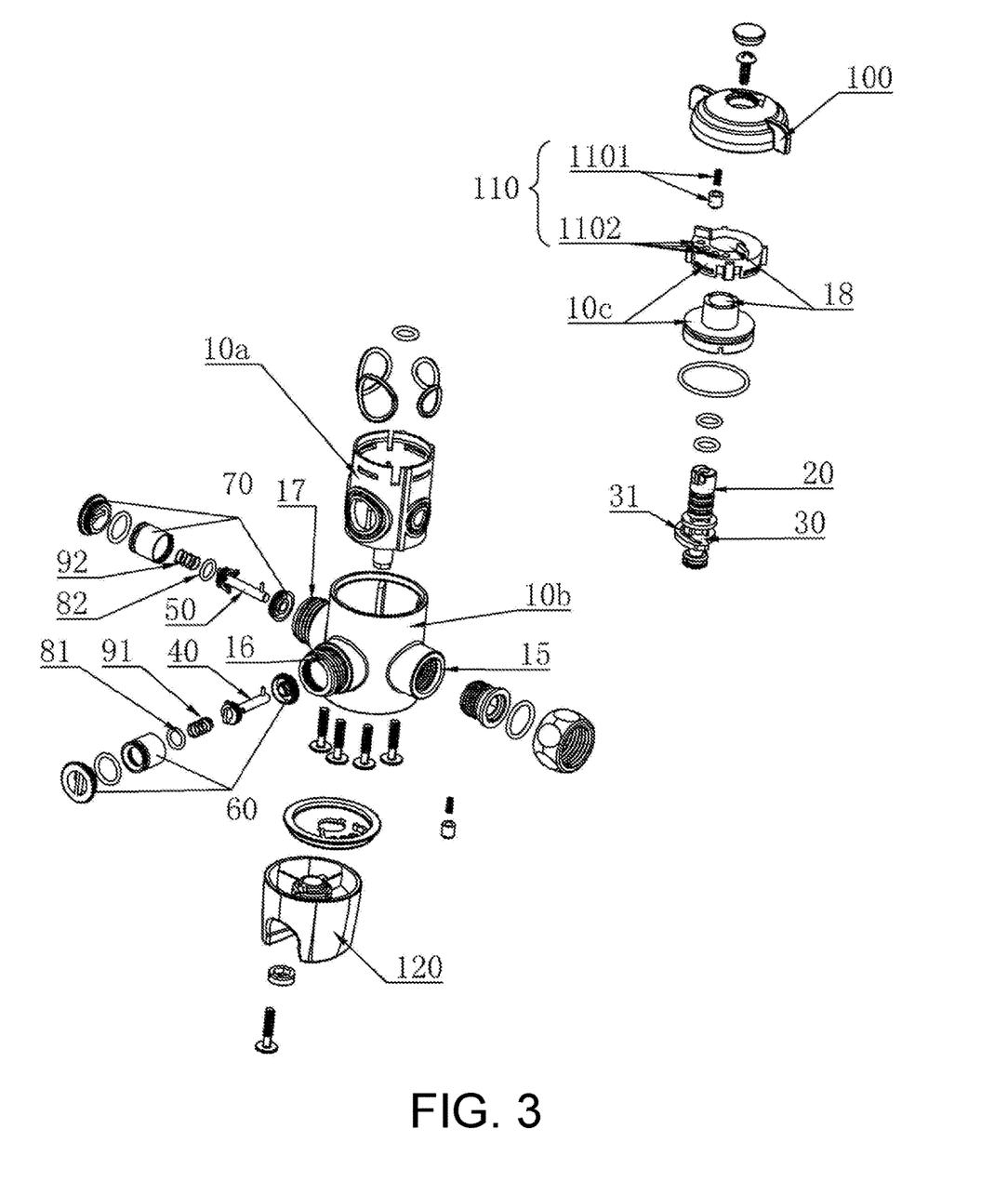
FIG. 3 is an exploded view of a water path switching device according to an embodiment of the present application.
Figure 4:
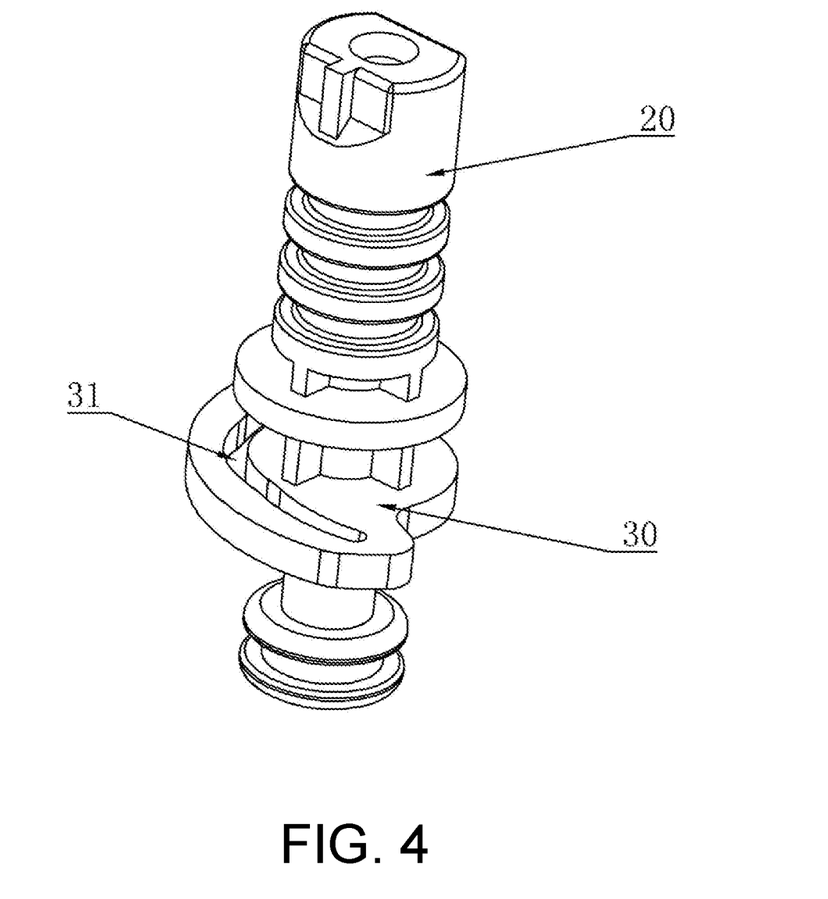
FIG. 4 is an assembled three-dimensional view of a rotating shaft and a rotating plate of a water path switching device according to an embodiment of the present application.
Figure 5:
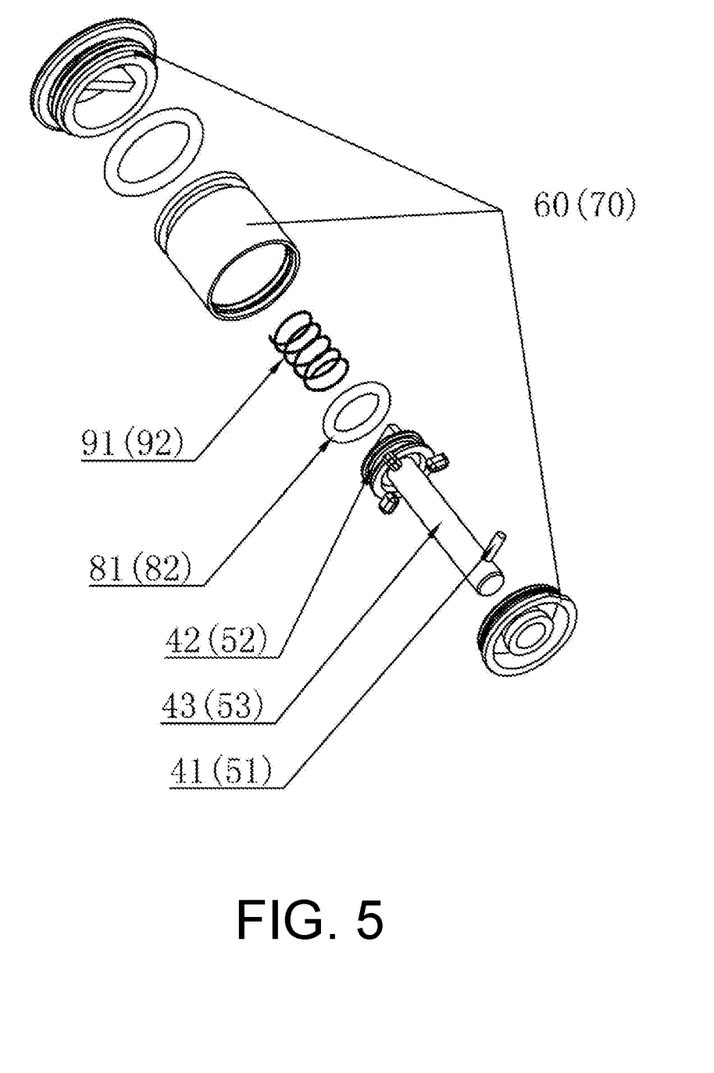
FIG. 5 is an exploded three-dimensional view of a first valve seat and a second valve seat of a water path switching device according to an embodiment of the present application.
Figure 6:
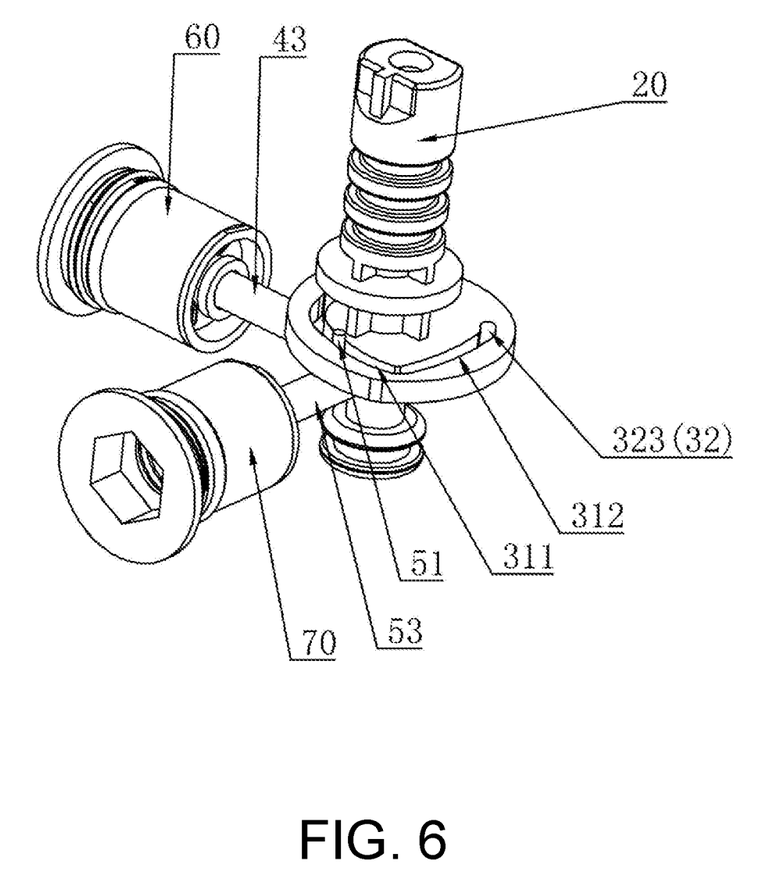
FIG. 6 is a partial three-dimensional assembly diagram of a water path switching device according to an embodiment of the present application.
Figure 7:
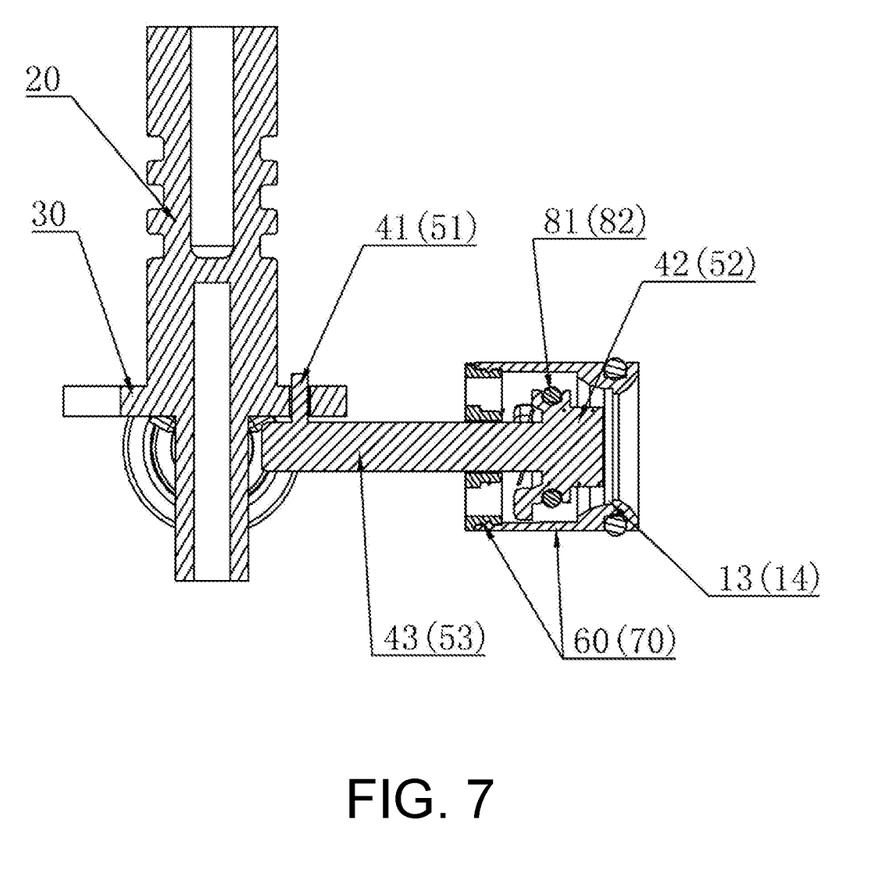
FIG. 7 is a cross-sectional view of FIG. 6.

Preferably, the distances from the first high point 321, the second high point 322 and the third high point 323 to the axis line of the rotating shaft 20 are equal.

Specifically, in the water path switching device of the embodiment, the sliding groove 31 penetrates through the front and back of the rotating plate 30, the first sliding-contact part 41 is a first sliding column, the second sliding-contact part 51 is a second sliding column, the first sliding column and the second sliding column are arranged in the sliding groove 31 in a penetrating mode, the first valve core 40 further includes a first valve plate 42 and a first sliding rod 43 connected to the first valve plate 42 and the first sliding column, and the second valve core 50 further includes a second valve plate 52 and a second sliding rod 53 connected to the second valve plate 52 and the second sliding column.

As shown in FIG. 2, FIG. 3, FIG. 5 and FIG. 6, in the water path switching device of the embodiment, a first valve seat 60 with two open ends is arranged in the first water outlet connector 16 in a sleeved manner, the first valve seat 60 is provided with the first water outlet 13, the first valve core 40 is slidably arranged in the first valve seat 60 and in opening and closing fit with the first water outlet 13, a second valve seat 70 with two open ends is arranged in the second water outlet connector 17 in a sleeved manner, the second water outlet 14 is formed in the second valve seat 70, and the second valve core 50 is slidably arranged in the second valve seat 70 and in opening and closing fit with the second water outlet 14. By arranging the first valve seat 60 and the second valve seat 70, the first valve core 40 is arranged on the first valve seat 60, and the second valve core 50 is arranged on the second valve seat 70, so that the process of installing the first valve core 40 and the second valve core 50 on the valve body 10 is simpler and more convenient.

In the water path switching device of the embodiment, a first sealing member 81 is arranged between the first valve core 40 and the first water outlet 13, a first elastic member 91 is further arranged between the first valve core 40 and the first valve seat 60, and the first elastic member 91 applies elastic force to the first valve core 40 in the direction where the first water outlet 13 is closed. A second sealing member 82 is arranged between the second valve core 50 and the second water outlet 14, a second elastic part 92 is further arranged between the second valve core 50 and the second valve seat 70, and the second elastic part 92 applies elastic force to the second valve core 50 in the direction where the second water outlet 14 is closed. Both the first sealing member 81 and the second sealing member 82 are sealing rings, and are arranged on the first valve plate 42 and the second valve plate 52 in a sleeving mode, respectively. By arranging the first elastic member 91 and the second elastic part 92, the first valve core 40 and the second valve core 50 can seal the corresponding water outlets more reliably.

In the water path switching device of the embodiment, the water path switching device further includes a knob 100 rotationally connected to the valve body 10, the knob 100 is connected to the outer end of the rotating shaft 20 so as to drive the rotating shaft 20 to rotate, and a grade positioning structure 110 is arranged between the knob 100 and the valve body 10. Specifically, the grade positioning structure 110 includes a spring pin 1101 arranged on the knob 100, and a plurality of positioning holes 1102 formed in the valve body 10, when the knob 100 rotates relative to the valve body 10, the spring pin 1101 and the positioning holes 1102 are sequentially and cooperatively locked, and the water path switching device is provided with four positioning holes 1102 in the embodiment, that is, the water path switching device has four working grades. Alternatively, the spring pin 1101 may be arranged on the valve body 10, and the positioning holes 1102 may be formed in the knob 100. Certainly, the grade positioning structure 110 may also be optionally arranged between the rotating shaft 20 and the valve body 10, one of the rotating shaft 20 and the valve body 10 is provided with the spring pin 1101, and the other of the rotating shaft 20 and the valve body 10 is provided with a plurality of positioning holes 1102. By arranging the grade positioning structure 110, grade control is more precise, and the adjustment process is more visual.

The specific working process of the embodiment is briefly described as follows.

Figure 8:
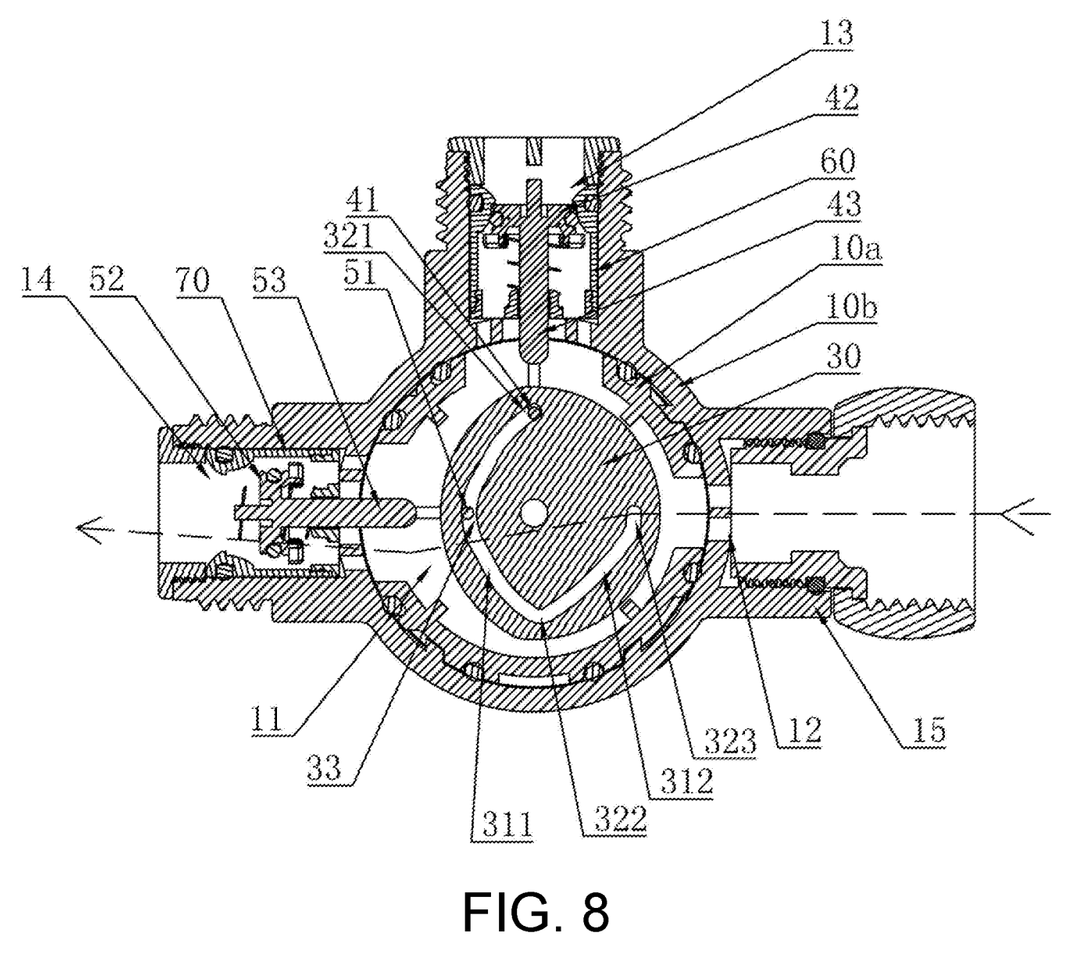
FIG. 8 is a schematic diagram of a grade positioning structure of a water path switching device according to an embodiment of the present application in a first grade (where a first water outlet is closed and a second water outlet is open)

As shown in FIG. 8, at this time, the knob 100 is turned, then the spring pin 1101 is locked in the first positioning hole 1102 of the four positioning holes 1102, that is, when the knob 100 is in the first grade, the first sliding-contact part 41 slides to the first high point 321, then the first valve core 40 closes the first water outlet 13, and the second sliding-contact part 51 slides to the low point 33, so that the second valve core 50 opens the second water outlet 14, and water in the water inlet 12 flows into the valve cavity 11 and then flows out from the second water outlet 14.

Figure 9:
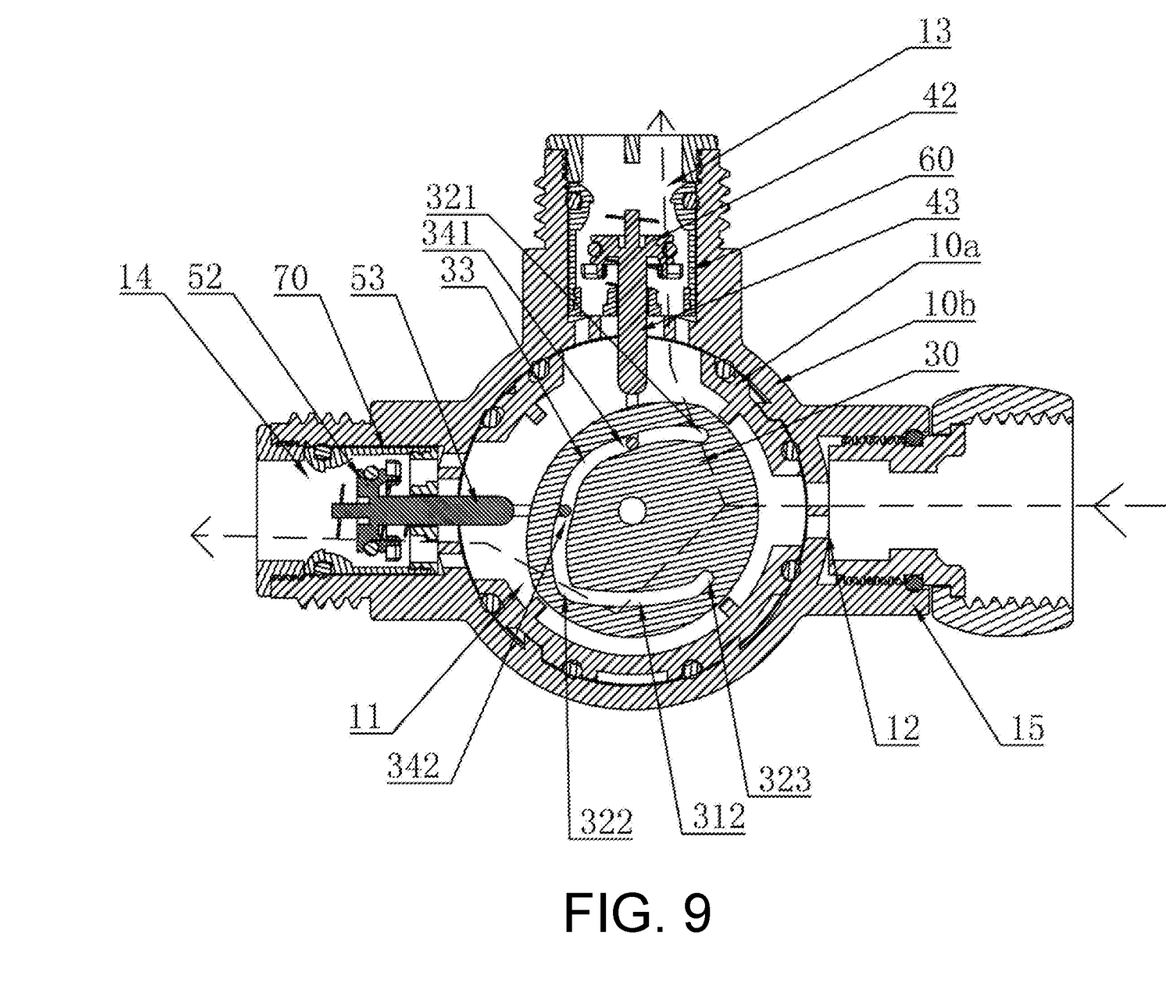
FIG. 9 is a schematic diagram of a grade positioning structure of a water path switching device according to an embodiment of the present application in a second grade (where a first water outlet is open and a second water outlet is open)

As shown in FIG. 9, in the state shown in FIG. 8, the knob 100 is continued being turned in the same direction, then the spring pin 1101 is locked in the second positioning hole 1102 adjacent to the first positioning hole 1102 among the four positioning holes 1102, that is, when the knob 100 is in the second grade, the first sliding-contact part 41 slides to the first intermediate point 341, thus the first valve core 40 opens the first water outlet 13, and the second sliding-contact part 51 slides to the second intermediate point 342, so that the second valve core 50 opens the second water outlet 14, and water in the water inlet 12 flows into the valve cavity 11 and then flows out from the first water outlet 13 and the second water outlet 14.

Figure 10:
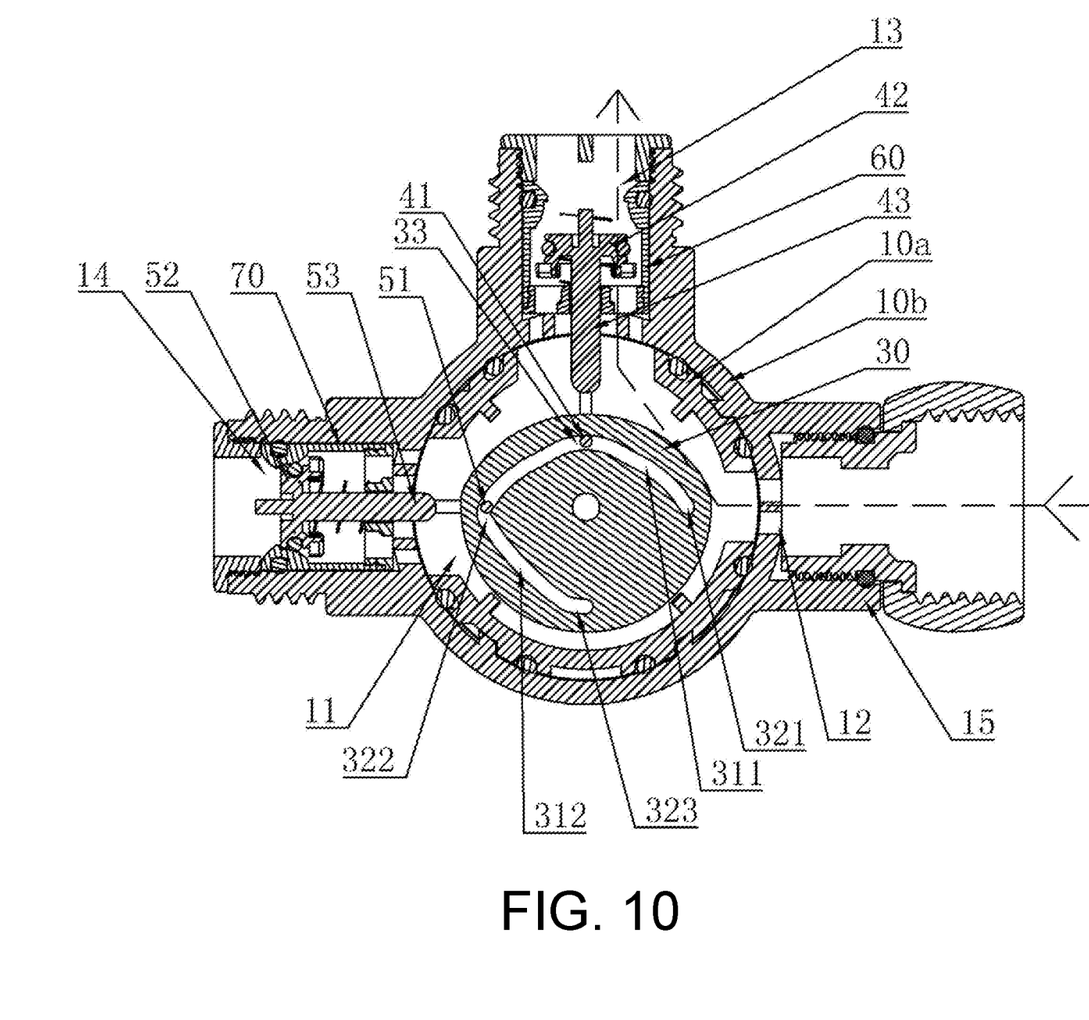
FIG. 10 is a schematic diagram of a grade positioning structure of a water path switching device according to an embodiment of the present application in a third grade (where a first water outlet is open, and a second water outlet is closed)

As shown in FIG. 10, in the state shown in FIG. 9, the knob 100 is continued being turned in the same direction, then the spring pin 1101 is locked in the third positioning hole 1102 of the four positioning holes 1102, that is, the knob 100 is in the third grade, the first sliding-contact part 41 slides to the low point 33, thus the first valve core 40 opens the first water outlet 13, and the second sliding-contact part 51 slides to the second high point 322, so that the second valve core 50 closes the second water outlet 14, and water in the water inlet 12 flows into the valve cavity 11 and then flows out from the first water outlet 13.

Figure 11:
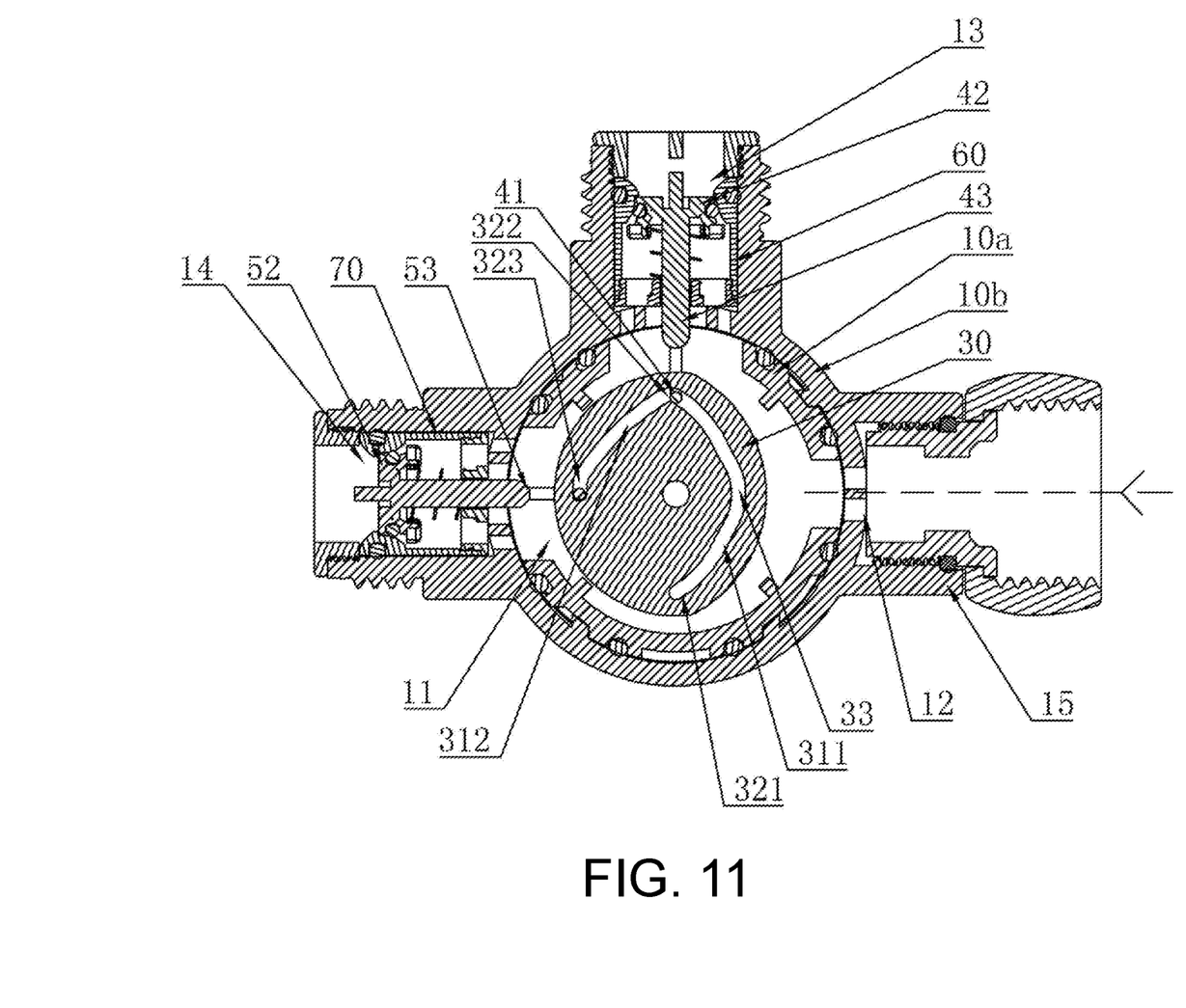
FIG. 11 is a schematic diagram of a grade positioning structure of a water path switching device according to an embodiment of the present application in a fourth grade (where a first water outlet is closed, and a second water outlet is closed).

As shown in FIG. 11, in the state shown in FIG. 10, the knob 100 is continued being turned in the same direction, then the spring pin 1101 is locked in the fourth positioning hole 1102 of the four positioning holes 1102, that is, the knob 100 is in the fourth grade, the first sliding-contact part 41 slides to the second high point 322, thus the first valve core 40 closes the first water outlet 13, and the second sliding-contact part 51 slides to the third high point 323, so that the second valve core 50 closes the second water outlet 14, and the water path switching device is in a water-stop state at this time.

By turning the knob 100, the water path switching device is directly switched between the states shown in FIG. 8, FIG. 9, FIG. 10 and FIG. 11 so as to open and close the water outlets as required, and a labor-saving switching process is achieved.

According to another aspect of the present application, the present application further provides shower equipment which includes shower heads and the water path switching device of any one of the above description, and the first water outlet 13 and/or the second water outlet 14 are/is connected to the shower heads. During usage, for example, the shower heads are provided with a handheld shower head and an overhead shower head, the handheld shower head is connected to the first water outlet 13, and the overhead shower head is connected to the second water outlet.

In the water path switching device of the embodiment, an insertion base 120 is further installed on the outer side of the valve body 10 of the water path switching device. The insertion base 120 may be used for inserting and holding the handheld shower head, then there is no need to independently fix an insertion base 120 on a wall, and therefore the structure is more compact.

Unless otherwise defined, the technical and scientific terms used herein have the same meanings as commonly understood by those skilled in the art of the present application. The terms used herein are only for describing specific implementation purposes, and are not intended to limit the present application. The terms such as "component" appearing herein may mean a single part or a combination of a plurality of parts. Terms such as "installation" and "arrangement" appearing herein may either mean that one component is directly attached to another component, or that one component is attached to another component through an intermediate part. Features described in one embodiment herein may be applied to another embodiment alone or in combination with other features, unless the features are not applicable to the other embodiments or otherwise stated.

The above description shows and describes the preferred embodiments of the present application. As mentioned above, it should be understood that the present application is not limited to the forms disclosed herein, and should not be regarded as an exclusion of other embodiments, but can be used in various other combinations, modifications and environments, and can be modified through the above teachings or technologies or knowledge in related fields within the scope of the inventive concept herein. The modifications and variations made by those skilled in the art without departing from the spirit and scope of the present application should fall within the protection scope of the appended claims of the present application.

What is claimed is:

1. A water path switching device, comprising:
   a valve body, provided with a valve cavity, a water inlet communicating with the valve cavity, and at least two water outlets, wherein the water outlets comprise a first water outlet and a second water outlet;
   a rotating shaft, rotationally connected to the valve body and provided with an outer end located outside the valve cavity and an inner end located inside the valve cavity;
   a rotating plate, arranged in the valve cavity and connected to the inner end of the rotating shaft so as to rotate with the rotating shaft, wherein the rotating plate is provided with a sliding groove, and the sliding groove is provided with high points far away from an axis line of the rotating shaft, and a low point close to the axis line of the rotating shaft;
   a first valve core, provided with a first sliding-contact part sliding in the sliding groove, wherein when the rotating plate rotates to drive the first sliding-contact part to slide to the high points, the first valve core is away from the axis line of the rotating shaft so as to close or open the first water outlet; and when the rotating plate rotates to drive the first sliding-contact part to slide to the low point, the first valve core is close to the axis line of the rotating shaft so as to open or close the first water outlet; and
   a second valve core, provided with a second sliding-contact part sliding in the sliding groove, wherein when the rotating plate rotates to drive the second sliding-contact part to slide to the high points, the second valve core is away from the axis line of the rotating shaft so as to close or open the second water outlet; and when the rotating plate rotates to drive the second sliding-contact part to slide to the low point, the second valve core is close to the axis line of the rotating shaft so as to open or close the second water outlet.

2. The water path switching device according to claim 1, wherein an axis line of the first water outlet is perpendicular to an axis line of the second water outlet, both the first valve core and the second valve core slide in a radial direction of the rotating shaft, and a sliding direction of the first valve core is perpendicular to that of the second valve core.

3. The water path switching device according to claim 2, wherein the sliding groove is provided with a first arc section, two ends of the first arc section form the high points, the high points include a first high point and a second high point, a middle portion of the first arc section forms the low point, when the first sliding-contact part slides to the first high point, the second sliding-contact part slides to the low point, and when the first sliding-contact part slides to the low point, the second sliding-contact part slides to the second high point.

4. The water path switching device according to claim 3, wherein a first intermediate point is formed between the first high point and the low point, a second intermediate point is formed between the second high point and the low point, and a distance from the first intermediate point to the axis line of the rotating shaft is between a distance from the first high point to the axis line of the rotating shaft and a distance from the low point to the axis line of the rotating shaft; and when the first sliding-contact part slides to the first intermediate point, the second sliding-contact part slides to the second intermediate point, the first valve core opens the first water outlet and the second valve core opens the second water outlet, or the first valve core closes the first water outlet and the second valve core closes the second water outlet.

5. The water path switching device according to claim 3, wherein the sliding groove further comprises a second arc section connected to the second high point, an end, away from the second high point, of the second arc section forms a third high point, and when the first sliding-contact part slides to the second high point, the second sliding-contact part slides to the third high point.

6. The water path switching device according to claim 5, wherein respective distances from the first high point, the second high point and the third high point to the axis line of the rotating shaft are equal.

7. The water path switching device according to claim 1, wherein the sliding groove penetrates through a front surface and a back surface of the rotating plate, the first sliding-contact part is a first sliding column, the second sliding-contact part is a second sliding column, the first sliding column and the second sliding column are arranged in the sliding groove in a penetrating mode, the first valve core further comprises a first valve plate and a first sliding rod connected to the first valve plate and the first sliding column, and the second valve core further comprises a second valve plate and a second sliding rod connected to the second valve plate and the second sliding column.

8. The water path switching device according to claim 1, wherein the valve body is provided with a first water outlet connector and a second water outlet connector, a first valve seat with two open ends is arranged in the first water outlet connector in a sleeved manner, the first valve seat is provided with the first water outlet, the first valve core is slidably arranged in the first valve seat and in opening and closing fit with the first water outlet, a second valve seat with two open ends is arranged in the second water outlet connector in a sleeved manner, the second valve seat is provided with the second water outlet, and the second valve core is slidably arranged in the second valve seat and in opening and closing fit with the second water outlet.

9. The water path switching device according to claim 8, wherein a first sealing member is arranged between the first valve core and the first water outlet, a first elastic member is further arranged between the first valve core and the first valve seat, and the first elastic member applies elastic force to the first valve core in a direction where the first water outlet is closed; and a second sealing member is arranged between the second valve core and the second water outlet, a second elastic part is further arranged between the second valve core and the second valve seat, and the second elastic part applies elastic force to the second valve core in a direction where the second water outlet is closed.

10. The water path switching device according to claim 1, further comprising a knob rotationally connected to the valve body, wherein the knob is connected to the outer end of the rotating shaft so as to drive the rotating shaft to rotate, a grade positioning structure is arranged between the knob/rotating shaft and the valve body, the grade positioning structure comprises a spring pin arranged on one of the knob/rotating shaft and the valve body, and a plurality of positioning holes formed in the other of the knob/rotating shaft and the valve body, and when the knob rotates relative to the valve body, the spring pin and the positioning holes are sequentially and cooperatively locked.

11. A shower equipment, comprising shower heads, wherein the shower equipment further comprises the water path switching device according to claim 1, and the first water outlet and/or the second water outlet are/is connected to the shower heads.

12. The shower equipment according to claim 11, wherein an insertion base is further installed on an outer side of the valve body of the water path switching device.

* * * * *